US006123794A

United States Patent [19]

Saff

[11] Patent Number: 6,123,794

[45] Date of Patent: Sep. 26, 2000

[54] METHOD FOR THE APPLICATION OF AN IMAGE TO A POROUS SUBSTRATE

[76] Inventor: Donald J. Saff, 5084 Ferry Neck Rd., Royal Oak, Md. 21662

[21] Appl. No.: 09/285,041

[22] Filed: Apr. 1, 1999

Related U.S. Application Data

[62] Division of application No. 08/795,209, Feb. 5, 1997, abandoned.

[51] Int. Cl.[7] .......................... B44C 1/175; B32B 31/00; C09J 103/00; B41M 3/12

[52] U.S. Cl. .......................... 156/230; 156/237; 156/240; 156/241; 156/247; 156/277; 156/289; 427/147; 427/149; 428/202; 428/714

[58] Field of Search .................................... 156/230, 231, 156/233, 236, 237, 240, 241, 247, 277, 287; 428/202, 914; 427/147, 148

[56] References Cited

U.S. PATENT DOCUMENTS

| | | | |
|---|---|---|---|
| 4,105,483 | 8/1978 | Lin . | |
| 4,279,954 | 7/1981 | Johnard . | |
| 4,820,559 | 4/1989 | Steelman . | |
| 4,966,815 | 10/1990 | Hare . | |
| 5,032,449 | 7/1991 | af Strom . | |
| 5,132,165 | 7/1992 | Blanco . | |
| 5,133,819 | 7/1992 | Croner . | |
| 5,229,201 | 7/1993 | Blanco . | |
| 5,350,474 | 9/1994 | Yamane . | |
| 5,418,041 | 5/1995 | Kent et al. . | |
| 5,573,865 | 11/1996 | Steelman et al. . | |
| 5,916,723 | 6/1999 | West | 430/126 |
| 5,922,159 | 7/1999 | Cahill | 156/239 |

FOREIGN PATENT DOCUMENTS

| | | |
|---|---|---|
| 0634295 A2 | 1/1995 | European Pat. Off. . |
| 0649756 A1 | 4/1995 | European Pat. Off. . |
| 2710293 | 3/1995 | France . |
| 656267 | 8/1951 | United Kingdom . |
| 2299545A | 10/1996 | United Kingdom . |

*Primary Examiner*—James Sells
*Assistant Examiner*—J. A. Lorengo

[57] ABSTRACT

Methods for applying images to various porous surfaces, including gesso, are disclosed, including providing a porous substrate including a coating comprising water to a surface thereon and providing a paper including a coating comprising a water-soluble adhesive on a surface thereon, applying an image comprising a water-soluble ink to the water-soluble adhesive coated surface of the paper, contacting the coated porous substrate with the image-containing coated paper surface; and applying pressure to the noncoated paper surface, whereby at least a portion of the image-containing surface is absorbed into the coated porous substrate.

8 Claims, 1 Drawing Sheet

5

METHOD FOR THE APPLICATION OF AN IMAGE TO A POROUS SUBSTRATE

This application is a divisional of application Ser. No. 08/795,209 filed Feb. 5, 1997, now abandoned.

FIELD OF THE INVENTION

The present invention relates to methods for applying an image to a porous substrate and the resulting product.

BACKGROUND OF THE INVENTION

U.S. Pat. No. 5,229,201 to Blanco relates to a process for applying decals to a porous substrate. Examples of porous substrates include stone and textiles such as canvas. The patent discloses that it may be desirable to apply a gesso material such as plaster of paris or gypsum to the substrate before applying the decal. It is further disclosed that a bonding agent is applied to a surface of the porous substrate. The bonding agent may include a fast-acting solvent, a moderating agent and a sealing agent and water. The decals comprise a backing layer, a first coating layer (a downcoat), a design layer, and a second coating layer (a covercoat). Paper is included among the examples of suitable backing material and it is preferred that the backing comprise paper which is coated with a water-soluble release material.

The design layer, which comprises at least one pigment, is situated between the two coating layers. The first and second coating layers include an absorbent component and an absorbent medium overcoat, examples of which are disclosed in column 6, lines 15–65. The patent further discloses that the design layer may be wet printed by conventional wet printing techniques including screen printing or offset lithography directly onto the coating layer thereof. In the Blanco process for applying a decal to a porous surface, the backing sheet is removed from the decal by applying water to the decal to dissolve the water soluble coating and to separate the backing sheet from the first coating layer and the rest of the decal. Then, the decal including the first coating layer is applied to the bonding agent by contacting the first coating layer with the bonding agent coated porous surface to effect absorption of the first coating layer onto the porous surface.

U.S. Pat. No. 5,132,165 to Blanco relates to methods of producing a ceramic decal applied to a vitreous surface. This is accomplished, in part, by sandwiching the design layer between two glass flux layers.

U.S. Pat. No. 4,105,483 to Lin describes transferring an image onto the surface of a non-porous substrate. The image is transferred to the substrate by the application of an adhesive and pressing the surfaces together. The paper, which holds the printed image, is removed by a solvent which dissolves the paper.

U.S. Pat. No. 5,032,449 to af Strom describes a transfer process which involves preparing an image with a plastic film before separating the image from the paper. The image is then released from the paper by wetting with water. After separation, the image is kept intact by the plastic film and can be transferred onto a substrate.

U.S. Pat. No. 4,820,559 to Steelman describes a method for transferring graphics to a display surface such as a glass window. The transfer is made possible by the application of a transfer fluid, such as mineral spirits, to transfer the image from a carrier to a substrate.

U.S. Pat. No. 5,418,041 to Kent describes the decoration of ceramic articles with a ceramic ink to form a 100% ceramic product. The ceramic article is prepared by application of an oil to its surface. The image is printed on a soluble film, such as polyvinyl alcohol, and then transferred to the ceramic article using conventional water flotation or transfer printing processes. The soluble film is washed from the ceramic article.

U.S. Pat. No. 4,966,815 to Hare describes transferring a computer created image on to a fabric, such as tee shirts by printing the design on to a heat transfer sheet, and ironing the design onto the fabric.

U.S. Pat. No. 5,133,819 to Croner describes a dry process for releasing an image onto a fabric. The process is accomplished in two steps. The first step involves transferring the design to an intermediary fabric by placing an iron-on mending fabric, having a heat active adhesive coating, in contact with the source image. Second, the design is transferred to the mending fabric by activating the adhesive coating by the application of heat. In the second step, the design is transferred to the finished fabric by placing the mending fabric in contact with the receiving fabric and applying heat.

U.S. Pat. No. 5,350,474 to Yamane relates to a method for thermally transferring a design onto a receiving substrate. The process involves creating an image on a hot melt type adhesive by using a heat sensitive image transfer type recording device. The image is transferred to the receiving substrate, such as cloth, by pressing the transfer sheet and the receiving substrate together and applying heat.

The prior art processes for application of images to porous substrates and the resulting products are entirely different than the processes and products of the present invention.

SUMMARY OF THE INVENTION

In accordance with the present invention, a method has now been devised for applying an image to a porous substrate, comprising the steps of:

(a) providing a paper including a coating comprising a water-soluble adhesive on a surface thereon;

(b) applying an image comprising a water-soluble ink to the water-soluble adhesive coated surface of the paper;

(c) providing a porous substrate including a coating comprising water on a surface thereon;

(d) contacting the coated porous substrate surface with the image-containing coated paper surface; and (e) applying pressure to the non-image-coated paper surface, whereby at least a portion of the image-containing coated surface is absorbed into the porous substrate.

A further aspect of the present invention relates to a decorated porous substrate comprising a porous substrate, a layer comprising water disposed on the porous substrate, and an image disposed on the porous substrate, said image comprising a water-soluble ink and a water-soluble adhesive absorbed at least partially into the porous substrate.

DETAILED DESCRIPTION OF THE INVENTION

Figure 1:
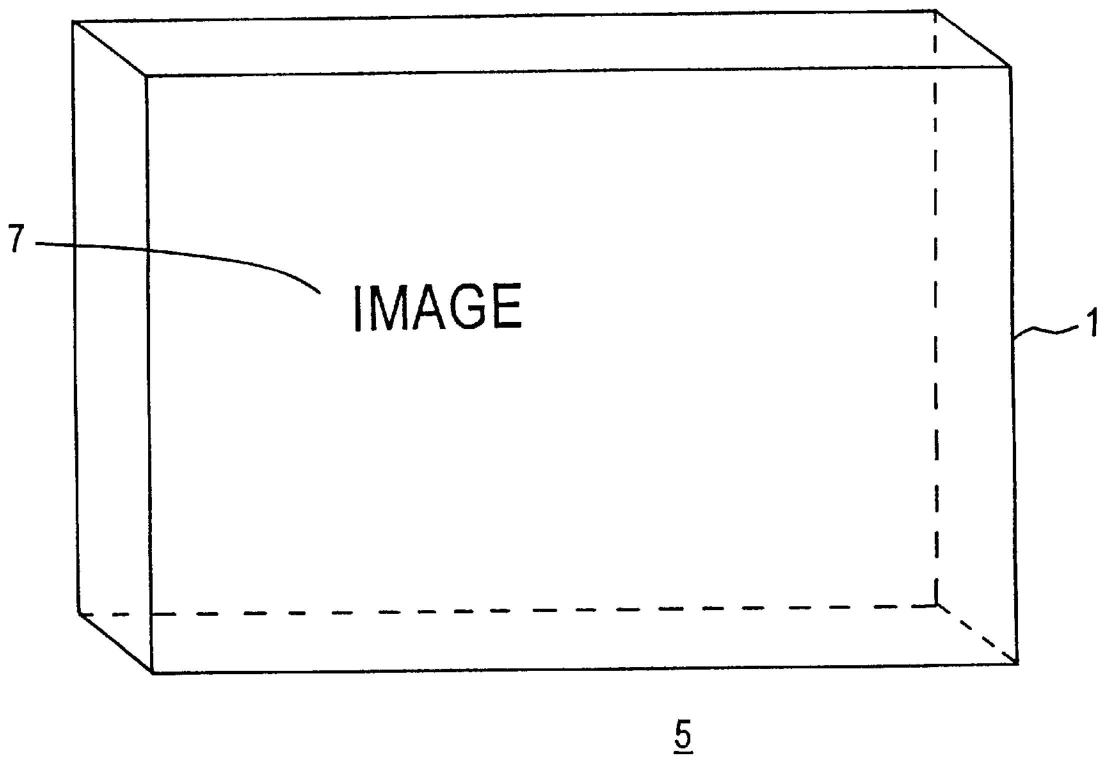
FIG. 1 depicts a view of a surface of a decorated porous substrate according to the present invention.

Previous attempts to apply conventional decals directly onto porous surfaces have not proven to be generally successful. The decals do not become "fixed" to the surface, as is the case with non-porous or impervious substrates such as glazed ceramic surfaces and glass, and will generally not be sufficiently absorbed into these surfaces to a sufficient extent to provide an acceptable product. The present invention is based, in part, on the surprising and unexpected discovery by the inventor, that by employing the claimed process, application of an image to the substrate is enabled, and absorption into its surface is greatly facilitated so as to provide an acceptable product.

In the method of the present invention, an image is applied to a porous substrate. The method comprises the steps of:

(a) providing a paper including a coating comprising a water-soluble adhesive on a surface thereon;

(b) applying an image comprising a water-soluble ink to the water-soluble adhesive coated surface of the paper;

(c) providing a porous substrate including a coating comprising water on a surface thereon;

(d) contacting the coated porous substrate with the image-containing coated paper surface; and (e) applying pressure to the non-image-coated paper surface, whereby at least a portion of the image-containing coated surface is absorbed into the porous substrate.

The particular paper used in the methods of the present invention may be any paper with which includes a coating comprising a water-soluble adhesive on a surface thereon to facilitate the transfer process. The stock may be light or heavier though heavier stocks are preferred. The water-soluble adhesive may be applied directly to a surface of the paper. Alternatively, pre-coated paper may be obtained commercially.

Where it is desired to apply a water-soluble adhesive to the paper, the paper is prepared by applying a coating comprising a water-soluble adhesive to a surface thereon. The coating may be applied by means conventional in the art, for example, by screen printing the water-soluble adhesive, rolling the water-soluble adhesive with a paint roller or spraying the water-soluble adhesive onto the paper. Examples of suitable water-soluble adhesives include, for example, water-based reversible glues, methyl cellulose glue, carboxy methyl cellulose, sodium carboxymethyl cellulose, hydroxyethyl cellulose, hydroxy propyl cellulose, gum cellulose, polyvinyl alcohol, casein, dextrins, gelatin, alginates, gums, e.g., gum tragacanth and gum arabic.

In some instances, it is desirable to utilize a commercially available paper which is pre-coated with an adhesive layer. These papers are known in the arts as "duplex" or "decal" paper or "lithographic transfer paper." These papers are produced by utilizing a water-leaf (non-sized) or low-sized paper upon which a thin layer of gelatin or other water-based reversible glue is applied. The glue is screen printed, sprayed or brushed onto the paper and allowed to dry. Lithographic transfer paper may be obtained commercially from Dolphin or Charbonnel or most fine arts graphic suppliers.

In preparing the decorated porous substrates of the present invention, an image comprising a water-soluble ink is applied to the water-soluble adhesive coated surface of the paper.

The image comprising a water-soluble ink may be applied to the paper by any of the means well-known in the arts. For example, the water-soluble ink image may be airbrushed or screen printed onto the paper. In a preferred embodiment, a digitized image, created in a computer or scanned from an external image, is printed by a jet spray printer or bubble jet printer such as those manufactured by Canon and Hewlett-Packard for low resolution imaging, or by an Iris printer made by Scitex Corporation of Bedford, Mass. for continuous-tone apparent 1800 dpi high resolution. Printer resolution may vary from low to high. A preferred color digital jet spray printer is the Iris printer, a high resolution, 4-color printer. The Iris printer is capable of printing a 34 inch×46.8 inch image area while a Vutek printer is capable of printing a 16 foot wide image. When a digitized image is created, the image may be "flopped" or reversed in the computer so that the image will have the correct orientation when transferred from the printed paper to the substrate.

The ink formulations may be varied depending on the desired results, as is well known to those skilled in this art. Ink supplied by the manufacturers of color jet-spray printers tend to be more fugitive than those inks produced for archival purposes. For example, most Iris inks fade. As an alternative, if desired, inks made by I-Lab may be used to prevent color change. Color calibration, if desired, may be accomplished by, for example, image manipulating software such as "Photoshop."

The particular porous substrates to which the images of this invention can be applied generally have a porosity of generally greater than about 10%, and preferably greater than about 15%. The substrates to which the images of the present invention may be applied are quite varied. They include, for example, gesso, e.g., plaster of paris, lime plaster, gypsum, drywall mud, calcined gypsum plaster (i.e. HYDROCAL® brand calcined gympsum, manufactured by the U.S. Gypsum Company), concrete and the like. These gesso materials may also comprise a calcium carbonate and/or an adhesive. They also include, for example, non-gesso porous substrates such as wood, metal, masonite, and various textiles such as cloth, canvas and the like which may be treated with absorbent grounds, if appropriate.

In many instances, from the standpoint of color, it is desirable that the porous substrate not have a generally dark color because the image may not be easily seen when applied thereto.

Many of these non-gesso porous substrates do have some problem with the ultimate adhesion of the image thereto. It may therefore be desirable to apply a gesso material to these surfaces, including wood surfaces, before application of the image thereto. It may also be desirable to apply an adhesive to the non-gesso porous substrate before application of the gesso material to facilitate adhesion thereto.

For example, a panel of honeycomb aluminum with aluminum skin may be prepared with a layer of galvanized hardware cloth screwed to the surface with stainless steel screws. The cloth and aluminum may be sprayed with an adhesive, preferably a Link adhesive, to facilitate the bonding of the gesso material to the surface upon which the plaster is to be applied. A thin layer of the gesso material may be applied and trowelled smooth. Alternatively, the gesso material may be cast as a monolithic block.

In addition, when the porous surface, such as wood surface, is too porous, or has an absorption of greater than about 25%, it may also then be desirable to apply a sealing layer, again with a material such as gesso or some other sealant or primer, to partially seal these surfaces before application of the image thereto.

When the image is to be applied to a gesso material, the gesso is permitted to solidify before application of the image. The amount of moisture retained in the substrate may vary depending on the result desired by the skilled artisan. For example, the substrate may be permitted to air dry for several days before application of the image, drying of the substrate may be facilitated through the use of a heat source such as heat lamps, or the image may be applied after the substrate has solidified but while some moisture is still retained therein.

In preparing the decorated porous substrate of the present invention, the porous substrate is prepared for image transfer by applying a coating comprising water to a surface thereon. The coating may be applied by means conventional in the arts, for example, by spraying, sponging or brushing. The coating may consist only of water or comprise a mixture of water and one or more adhesives.

The transfer of the image may be controlled so that the image is perfectly reproduced on the substrate. Expressive distortion, apparent watercolor washes or painterly brush-strokes can also be accomplished. When water alone is applied, and allowed to absorb into the surface of the substrate, the image will transfer undistorted.

Alternatively, where an expressive image transfer is desired, the porous substrate is prepared for image transfer by applying a coating comprising water and one or more adhesives to a surface thereon. The expressiveness will be governed by the viscosity of the adhesive, which can range from water-like to syrupy, placement of the coating on the substrate, the gesture of its application, the duration of time between application of the coating and image transfer, the tools used to apply the coating to the substrate, and the kind of burnishing that is applied.

Where an expressive image transfer is sought, suitable adhesives to be mixed with the water include, for example, glues, methyl cellulose glue, carboxy methyl cellulose, sodium carboxymethyl cellulose, hydroethyl cellulose, hydroxy propyl cellulose, gum cellulose, carboxy vinyl polymers, casein, acrylic resins, dextrins, alginates, gums, e.g., gum tragacanth, and gum arabic.

Where the coating applied to the surface of the porous substrate is a mixture of water and one or more adhesives, the amount of adhesive present in the formulation should range from about 10 to 80%, more preferably from about 20 to 60%.

As greater amounts of coating are applied to the surface of the porous substrate, the applied image is absorbed deeper into the coated porous substrate resulting in a less vivid image. Application of heat can "pull" the image back up towards the surface of the porous substrate to make the image more vivid.

Once the image is applied to the water-soluble adhesive coat on the paper, the next step is to bring the image-containing coated paper surface in contact with the coated porous substrate. This may be accomplished by, for example, positioning or moving the image into the correct or desired position and laying the paper "image side" down on the coated surface of the substrate.

Next, pressure may be applied to the "back" of the paper, e.g., the non-image coated paper surface, whereby at least a portion of the image-containing coated surface is absorbed into the coated porous substrate. The pressure may be applied by all conventional means in this art including, for example, hand rubbing, use of a Japanese woodcut barren, placing a weighted object on top of the paper so that the paper is disposed between the weighted object and the porous substrate.

Whether completion of image transfer has been achieved may be checked by picking up the paper and making a visual determination of the transfer progression. In the event that image transfer is not complete, however, it is important that the paper is returned to its original registration.

As explained above, when larger volumes of coating are applied to the surface of the porous substrate, the image is absorbed deeper into the porous substrate resulting in an image of diminished intensity or the complete disappearance of the image. Application of heat can "pull" the image back up towards the surface to increase the intensity of the image.

As a finishing step, a non-water based sealing agent may be heated and then applied to the surface of the image-containing surface of the porous substrate, heated again, and then buffed. These additional steps serve to bring the image back to the surface and to seal the surface. For example, once image transfer is complete and the substrate, if necessary, is allowed to dry for a few days, the absorbent surface of the substrate may be sealed by applying molten pure beeswax with a propane torch. While the wax is still liquid, it is buffed to a smooth surface. Upon sealing, image color should appear more saturated and intense.

Examples of sealing agents include, for example, paraffin woolfat, hydrogenated lanolin, beeswax, microcrystalline wax, carnauba, spermaceti, solid hydrocarbons, wax-like materials such as poly(vinyl stearate) and poly(ethylene sebacate), candelilla wax, carnauba wax, rice wax, jojoba wax, lanolin, spermaceti wax, montan wax, ceresin, ozokerite, cocoa butter, Japan wax, and low molecular weight polyolefins such as polyethylene and ethylenevinyl acetate copolymer.

When a sealing agent is employed, it may be heated to a temperature sufficient to permit the particular sealing agent to be applied uniformly on the image-containing surface of the porous substrate.

DESCRIPTION OF THE DRAWING

As a result of the above-described process, obtained is a decorated porous substrate (5) comprising a porous substrate (1), an image disposed on the porous substrate (7), said image comprising a water-soluble ink disposed on said substrate.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of fabricating a decorated porous substrate, the decorated porous substrate consisting essentially of:

a porous substrate selected from the group consisting of plaster of Paris, lime plaster, gypsum, drywall mud, calcined gypsum plaster and concrete; and a digitized image at least partially absorbed onto the porous substrate, said image comprising a water-soluble ink;

said method comprising:

providing a paper having a non-image surface and a coated image-containing surface, wherein the coated image-containing surface is a surface having a water-soluble adhesive coating and a digitized image thereon;

providing a porous substrate having a water-coated surface, wherein the porous substrate is selected from the group consisting of plaster of Paris, lime plaster, gypsum, drywall mud, calcined gypsum plaster and concrete;

contacting the water-coated surface of the porous substrate with the coated image-containing surface of the paper, and applying pressure to the non-image surface of the paper, thereby transferring at least a portion of the image-containing coated surface to the water-coated surface of the porous substrate to produce said decorated porous substrate.

2. The method of claim 1, further comprising the step of applying heat to the porous substrate after the image-containing coated surface is absorbed into the porous substrate.

3. The method of claim 1, further comprising the step of applying a sealing agent to the surface of the image containing porous substrate, heating, and buffing.

4. The method of claim 1, wherein the porous substrate is selected from the group consisting of plaster of paris, lime plaster and gypsum.

5. The method of claim 1, wherein the paper is a duplex, decal, or lithography transfer paper.

6. The method of claim 1, wherein the image comprising a water-soluble ink is produced by a digital color printer.

7. The method of claim 6, wherein the color printer is a digital jet spray printer.

8. The method of claim 3, wherein the sealing agent is selected from the group consisting of paraffin, woolfat, hydrogenated lanolin, beeswax, microcrystalline wax, carnauba, spermaceti, solid hydrocarbons, as poly(vinyl stearate), and poly(ethylene sebacate), candelilla wax, carnauba wax, rice wax, jojoba wax, lanolin, spermaceti wax, montan wax, ceresin, ozokerite, cocoa butter, Japan wax, polyethylene, and ethylenevinyl acetate copolymer.

* * * * *